(12) United States Patent
Campbell et al.

(10) Patent No.: US 6,388,724 B1
(45) Date of Patent: May 14, 2002

(54) APPARATUS HAVING A PLATEN WITH PINS AND STANDOFFS, USED TO LAMINATE AN LCD TO OTHER OPTICAL COMPONENTS USING SILICONE GEL

(75) Inventors: Melvin L. Campbell, Marion; John W. Pomeroy, III, Cedar Rapids; Richard L. Robertson, Cedar Rapids; James D. Sampica, Cedar Rapids; Dennis M. Ternes, Marion, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/563,310

(22) Filed: May 2, 2000

(51) Int. Cl.⁷ ............................................. G02F 1/1335
(52) U.S. Cl. ...................................... 349/122; 349/187
(58) Field of Search ................................ 349/122, 158, 349/187

(56) References Cited

U.S. PATENT DOCUMENTS 5,742,372 A * 4/1998 Furukawa ................... 349/187
5,867,241 A    2/1999 Sampica et al. ............ 349/122
6,211,938 B1 * 4/2001 Mori .......................... 349/190

* cited by examiner

Primary Examiner—Toan Ton
Assistant Examiner—Andrew Schechter
(74) Attorney, Agent, or Firm—Nathan O. Jensen; Kyle Eppele

(57) ABSTRACT

A liquid crystal display optical component stack-up is created with reduced defects typically caused by adhesive materials used to attach optical components to the liquid crystal display, and with improved bond line control. First and second optical components are placed in a fixture having a plurality of pins extending from a bottom platen. A layer of silicone gel is placed between the first and second optical components. The plurality of pins orient the first and second optical components to achieve a desired alignment. A plurality of standoffs extending from the bottom platen and a top platen maintain a distance between the optical components and the platens to eliminate capillary action by the silicone gel adhesive, thereby aiding in bondline control.

12 Claims, 5 Drawing Sheets

APPARATUS HAVING A PLATEN WITH PINS AND STANDOFFS, USED TO LAMINATE AN LCD TO OTHER OPTICAL COMPONENTS USING SILICONE GEL

FIELD OF THE INVENTION

The present invention relates generally to liquid crystal displays, and more particularly, to a method of attaching optical components and optical component assemblies to a liquid crystal display while controlling adhesive bondline thicknesses between the optical components and the liquid crystal display.

BACKGROUND OF THE INVENTION

Liquid crystal displays (LCDs) include a liquid crystal material sandwiched between two sheets of glass. The two sheets of glass are typically a substrate and a color filter. Frequently, it is desirable to alter or enhance the performance of the LCD by attaching additional optical components to one or both of the LCD's two sheets of glass. These additional optical components can be items such as glass plates, diffusers, rigid compensators, heaters, and flexible films such as polarizers, retarders and dry film adhesives. Also, two or more of these optical components can be pre-assembled into an optical component assembly which is subsequently attached to the LCD. By way of example, organic films can be sandwiched between glass plates and bonded to the LCD glass in order to optically compensate the LCD.

Attaching additional optical components or optical component assemblies to an LCD presents a number of significant problems. First, the choice of adhesive used is critical to the display's performance. For instance, the index of refraction of the adhesive should closely match that of the optical components. Also, the adhesive should be as transparent as possible. These limitations and others will render many adhesives undesirable choices.

A second problem is related to the sensitivity of LCDs to strain. Strain on an LCD can cause performance defects such as Newton rings. High durometer (hard) adhesives, such as epoxy, used to attach optical components to an LCD typically cause strain on the LCD, and thus cause strain related defects as well. A related problem is due to the expensive nature and reparability of large LCDs. With some adhesives, once laminated (i.e., once the optical components or assemblies have been attached to the LCD), the LCD may be considered unrepairable. This is largely due to the strength of the bond, between the LCD glass and the glass of the optical component, resulting from the adhesive.

Some manufacturers of LCDs have, as a result of the problems associated with the use of available adhesives and known assembly methods, turned away from the adhesive approach to attaching optical components to the LCD. Instead, they mechanically attach the component to the LCD such that an air gap is formed between the two, thereby reducing strain and possibly improving reparability. However, this method is undesirable because it adversely effects the reflectance and contrast of the display.

Solutions to many of the above-mentioned problems are disclosed in commonly owned U.S. Pat. No. 5,867,241, issued on Feb. 2, 1999 to Sampica et al., and entitled "LIQUID CRYSTAL DISPLAY LAMINATION WITH SILICONE GEL ADHESIVE", which is herein incorporated by reference in its entirety. This patent teaches methods of bonding organic films or other optical components, which are sandwiched between glass, to the LCD with a silicone gel. Even with the use of silicone gel adhesive as taught in the above-referenced patent, a uniform bondline (gel joint) is necessary to enable disassembly and repair of the laminated stack and to optimize optical performance. It has been found that using some fabrication techniques, capillary action of the silicone gel between platens of the lamination fixture and the glass of the optical components or of the LCD can cause the cured bondlines to vary by a ratio of as much as 5 to 1. This undesirable effect renders it difficult to disassemble the laminated stack because the bondline can be too thin in the middle to pass a blade or wire without damaging the LCD. Another side effect of this non-uniform bondline is difficulty in achieving an adequate seal on the front surface.

SUMMARY OF THE INVENTION

A liquid crystal display optical component stackup is created with reduced defects typically caused by adhesive materials used to attach optical components to the liquid crystal display, and with improved bond line control. First and second optical components are placed in a fixture having a plurality of pins extending from a platen. A layer of silicone gel is placed between the first and second optical components. The plurality of pins orient the first and second optical components to achieve a desired alignment. A plurality of standoffs extending from the platen maintain the first optical component a distance above the first platen. This eliminates the possibility of capillary action occurring between the platen and the first optical component due to the silicone gel adhesive, thereby aiding in bond line control.

DETAILED DESCRIPTION OF AN ILLUSTRATIVE EMBODIMENT

The present invention includes an improved method of attaching optical components or optical component assemblies to the glass of an LCD. The method makes use of a silicone gel or other adhesive, which bonds the optical components or assemblies to the glass of the LCD, in conjunction with a novel lamination fixture and method. Using the techniques of the present invention in which the laminated stack is completely separated from the platens of the fixture, capillary action of the silicone gel above and below the stack is prevented, thus allowing bondlines between the components of the optical stack to be controlled to tight tolerances. With the silicone gel providing a very low durometer (soft) adhesive, the controlled bondlines allow the LCD to be repaired even after the optical components or assemblies have been attached.

Figure 1:
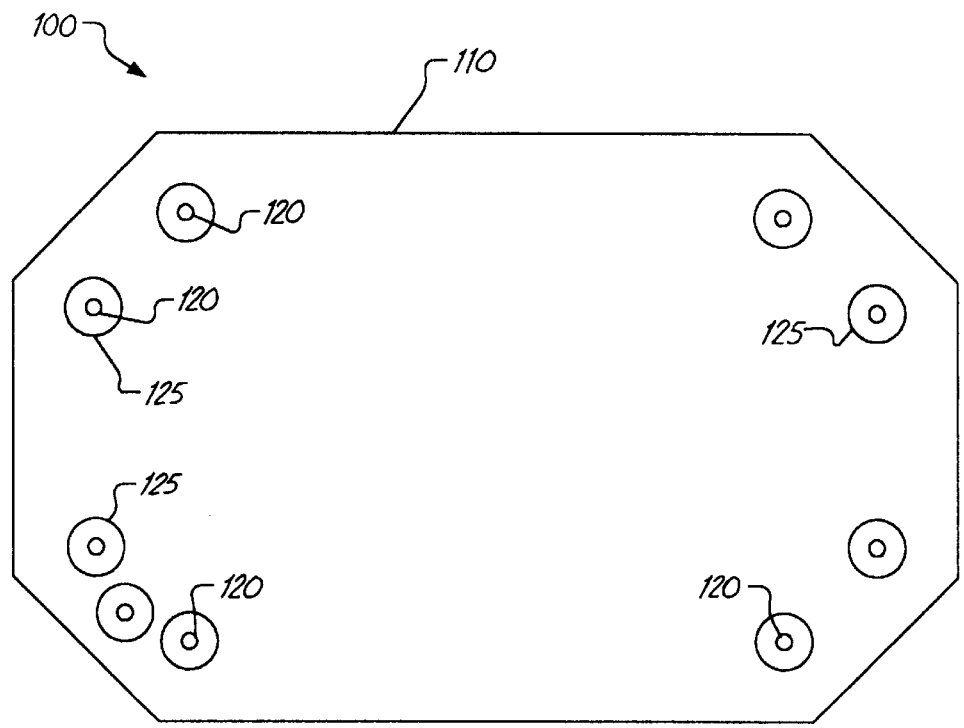
FIG. 1 is a top diagrammatic view of an alignment and assembly apparatus used in accordance with embodiments of the present invention to create LCD stack-ups.
Figure 2:
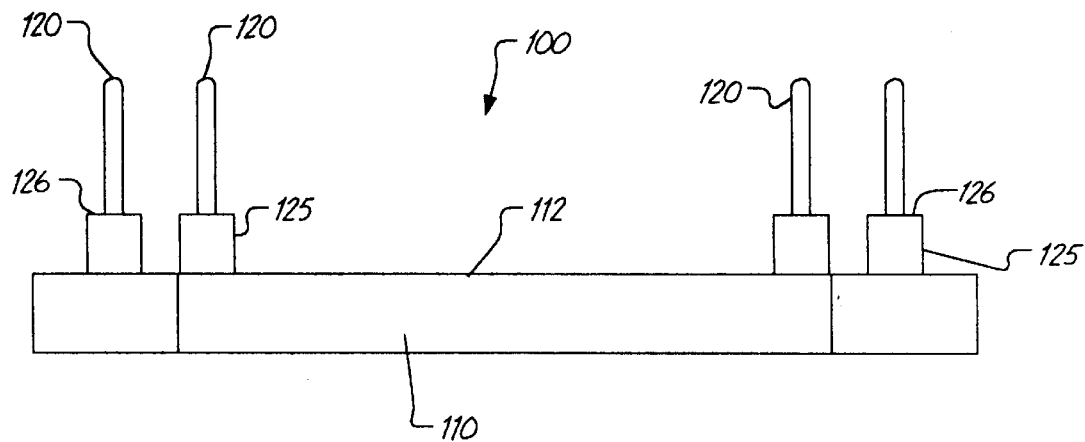
FIG. 2 is a side diagrammatic view of the alignment an assembly apparatus shown in FIG. 1.

FIGS. 1 and 2 are top and side diagrammatic views respectively of an assembly or lamination fixture used in accordance with methods of the present invention to produce LCD stack-ups by attaching optical components or assemblies to an LCD. Fixture 100 includes platen 110, pins 120 and bushings or standoffs 125. Pins 120 are pressed into platen 110 in a predetermined configuration to produce a pin field which corresponds to the dimensions of the LCD and of the optical components which are to be attached to the LCD. The configuration of pins 120 can be any configuration which will appropriately limit movement of the LCD and optical components as discussed below. It must be noted that the pin layout shown in FIGS. 2–6 is not an exact match of the pin layout shown in FIG. 1, but rather is altered slightly for illustrative clarity.

Standoffs 125 are positioned around some or all of pins 120 and provide surfaces 126 on which surfaces of a first optical component or assembly are supported. By supporting the optical component at a fixed distance above surface 112 of platen 110, standoffs 125 prevent capillary action of the silicone gel.

The embodiment of fixture 100 illustrated in FIGS. 1 and 2 corresponds to situations in which the LCD and the optical components to be attached to the LCD all have at least some dimensions in common. Pins 120 are arranged such that, when the LCD and optical components are lowered down within or between the pin field, each of four corners of the LCD and of the assemblies will be held in place between one of the four sets of adjacent pins. Still other pin configurations are possible.

In situations in which different sized components are being assembled to create the LCD stack-up, additional pins of various lengths can be employed to achieve the alignment. For instance, if the first optical component to be placed into the pin field was the smallest, pins which extend up from platen 110 no higher than the first component can be used. Then, when the larger LCD and second optical component are later inserted into the pin field, they will miss the top of the short pins and be aligned by other taller pins located on platen 110 in positions appropriate for the proper alignment.

Figure 3:
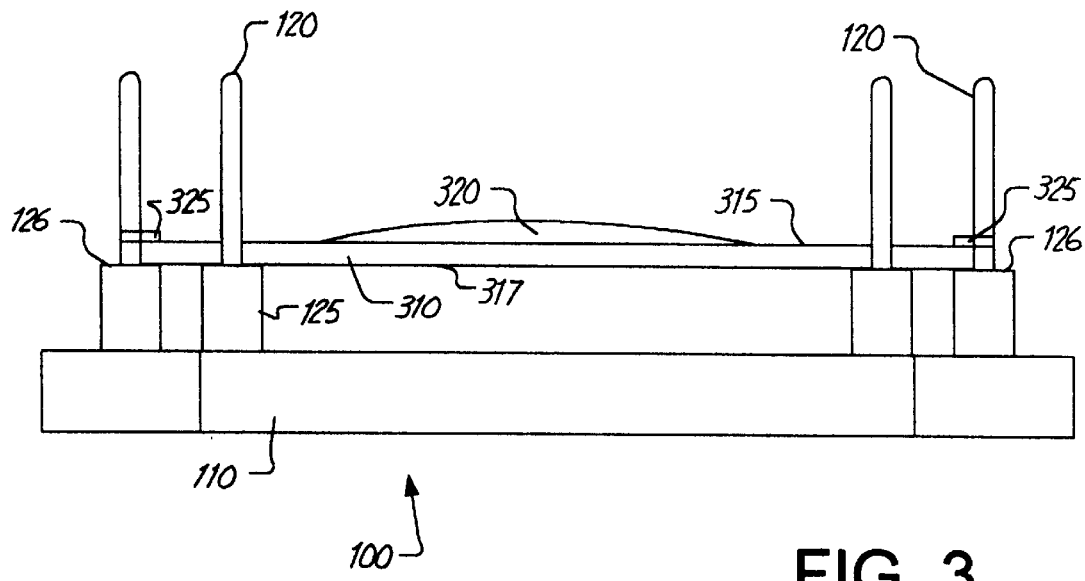
FIGS. 3 through 6 are side diagrammatic views of the alignment and assembly apparatus of FIGS. 1 and 2 which illustrate the various steps of creating an LCD stack-up with controlled bondline tolerances in accordance w embodiments of the present invention.

FIGS. 3 through 6 are diagrammatic side views illustrating fixture 100 used in the various steps of creating an LCD stack-up in accordance with the methods and embodiments of the present invention. The process of creating an LCD stack-up is as follows. As shown in FIG. 3, first or rear optical component or component assembly 310 is placed into the pin field of fixture 100 such that the four corners of component 310 are held securely in place by pins 120. Substantially planar glass surface 315 of component 310 is oriented in an upward direction away from platen 110 of fixture 100. Substantially planar glass surface 317 of component 310 is oriented downward and rests on surfaces 126 provided by standoffs 125. This keeps surface 317 elevated from platen 110, and thus prevents wicking of silicone gel and subsequent capillary action of the silicone gel.

On some of pins 120, shims or spacers 325 can also be attached. Shims 325 have a thickness (for example 10 mils) which is approximately equal to a desired bondline thickness. Shims 325 extend a small distance away from pins 120 toward the center of component 310, and will serve to hold the LCD slightly above surface 315.

Next, first quantity or layer 320 of silicone gel is placed on top of glass surface 315. In some embodiments, the silicone gel used is an off the shelf product purchased from General Electric under the product number GE-5844. As purchased, the gel comes in two parts, part "A" and part "B". Part A contains diphenyl-dimethyl-siloxane. Part B contains vinyl terminated diphenyl-dimethyl polymer. Part B also includes a hydrosilane functional crosslinking agent of unknown structure, but believed to be a low molecular weight siloxane. For the uses of the gel anticipated by its manufacturer, the GE-5844 gel is intended to be mixed in a 1:1 ratio of parts A and B. However, it has been discovered that, when mixed in a 5:1 ratio of part A to part B, the silicone gel is an excellent adhesive material for use in attaching the glass of an optical component or assembly to the glass of an LCD.

Figure 4:
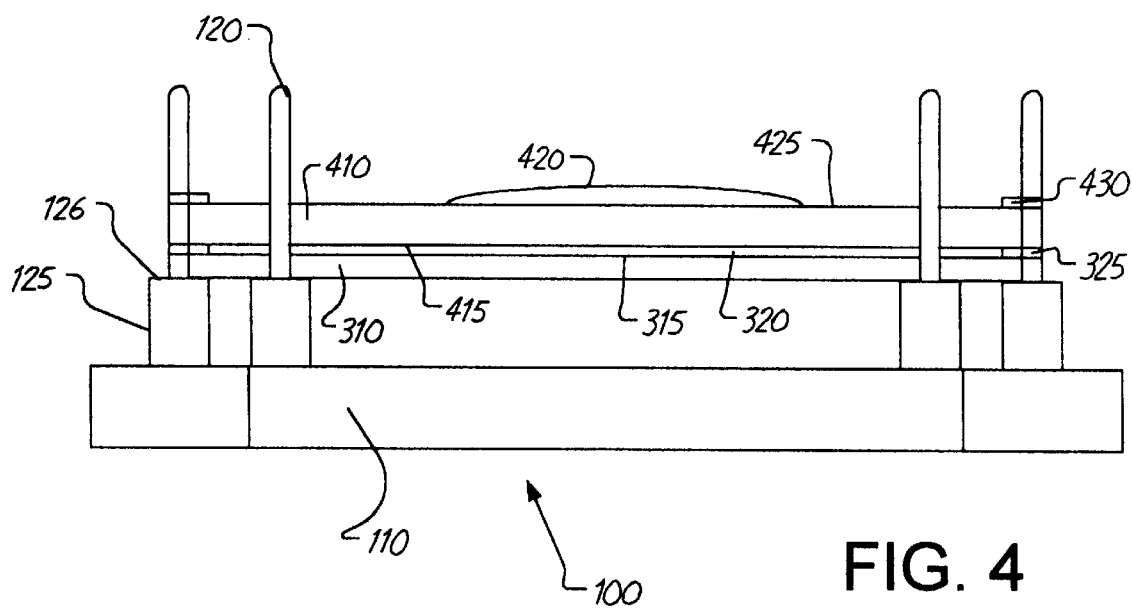

Next, as illustrated in FIG. 4, LCD 410 with flex tapes or cables (not shown) attached is placed within or between the pin field of fixture 100 on top of shims 325 and on silicone gel 320 such that four corners of LCD 410 are held securely in place by pins 120. By holding component 310 and LCD 410 securely in place, pins 120 of fixture 100 ensure proper alignment between component 310 and LCD 410. Typically, LCD 410 is placed into fixture 100 with surface 415 of its substantially planar glass substrate facing surface 315 of component 310 and at least partially supported by shims 325 so that silicone gel 320 forms a substantially uniform layer (bondline) in between these two surfaces. The silicone gel works best as an adhesive when the two surfaces it joins are both made from glass. In some embodiments, silicone gel 320 is of sufficient quantity that the layer formed between surfaces 315 and 415 is approximately 10 mils (0.010 inches) thick.

After placement of LCD 410 into fixture 100, surface 425 of the LCD's color filter is oriented in an upward direction away from platen 110. A second set of shims 430 is added to at least some of pins 120, and a second quantity or layer 420 of silicone gel is placed on top of glass surface 425. Silicone gel 420 is preferably mixed in the same ratio as silicone gel 320. The thickness of shims 430 and the quantity of silicone gel 420 are selected to achieve a desired bondline thickness, typically similar to the thickness of bondline 320.

Figure 5:
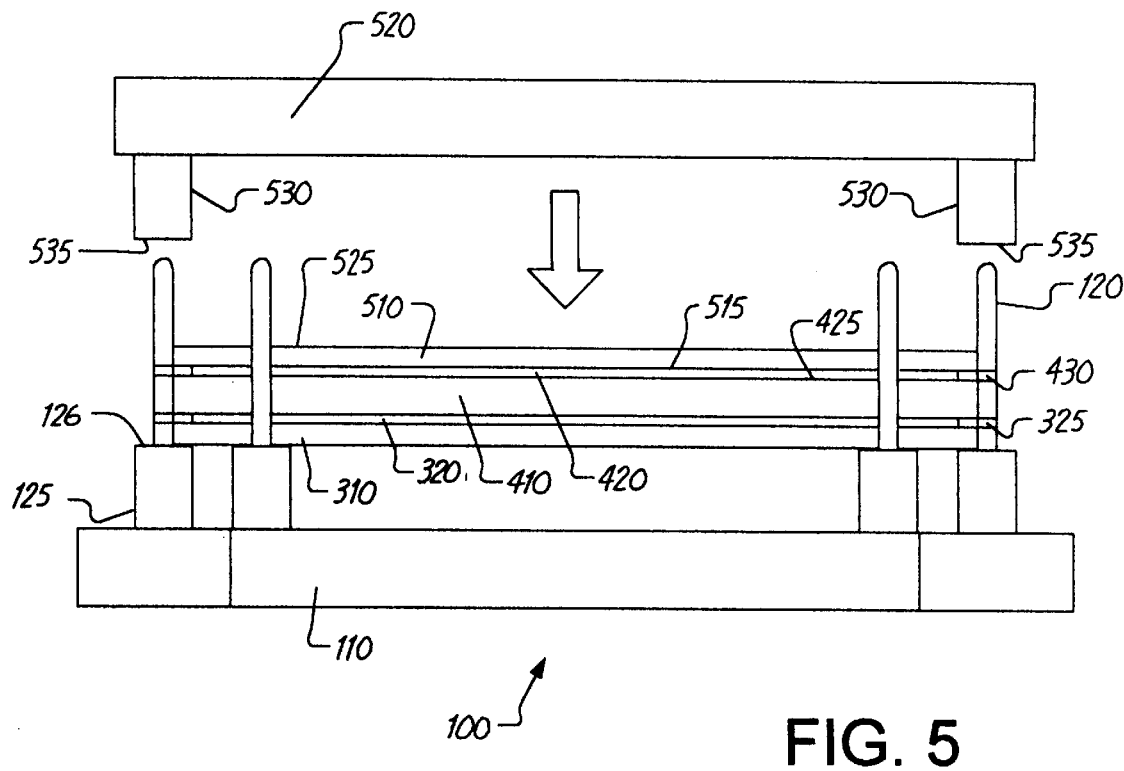

Next, as illustrated in FIG. 5, second or front optical component 510 is placed in fixture 100 on top of shims 430 and silicone gel 420 such that four corners of component 510 are held securely in place by pins 120. Thus, proper alignment between component 510 and LCD 410 and component 310 is ensured. With the help of shims 430, and the capillary action of the silicone gel eliminated between platen 520 and component 510 and between platen 110 and component 310, silicone gel 420 eventually forms a substantially uniform layer between substantially planar glass surface 515 of component 510 and substantially planar glass surface 425 of LCD 410. As before, silicone gel 420 is of sufficient quantity that the layer formed between surfaces 425 and 515 is approximately 10 mils thick in one exemplary embodiment.

Figure 6:
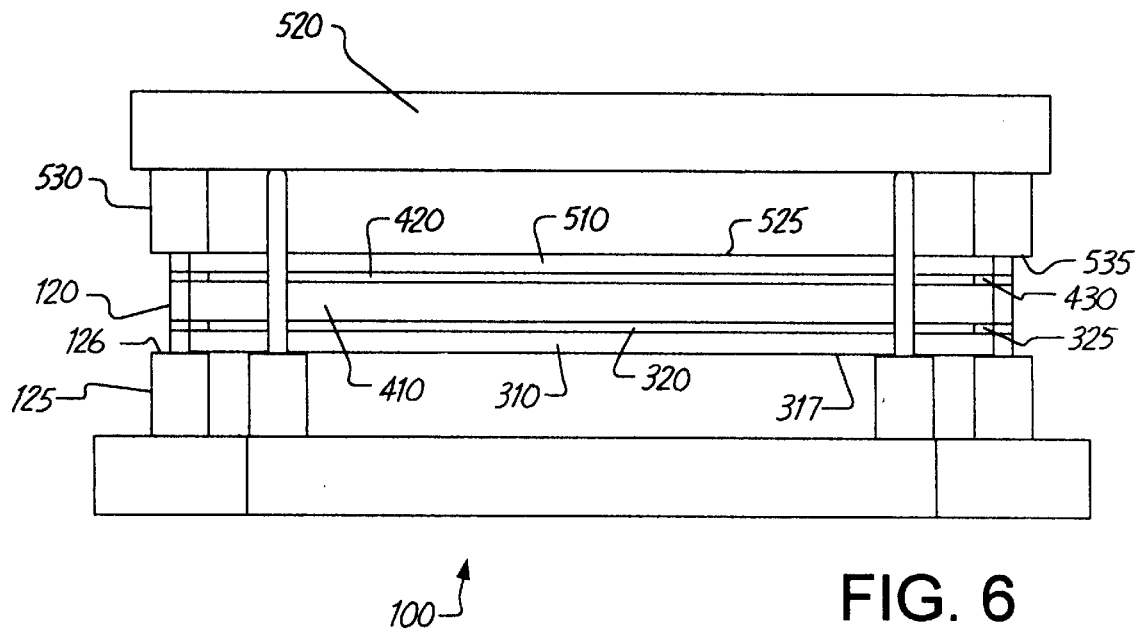

As is also illustrated in FIGS. 5 and 6, uniform pressure platen or weight 520 is placed in the pin field. Standoffs 530 attached to platen 520 are arranged to mate with selected pins 120 such that surfaces 535 provided by standoffs 530 rest on surface 525 of components 510. Platen 520 applies pressure to the entire LCD stack-up through the surface to surface contact points provided by standoffs 530. In some embodiments, the weight of platen 520 is chosen so as to apply an average pressure of about 0.1 PSI across the entire LCD stack-up. As was the case with standoffs 125, standoffs 530 maintain space between platen 520 and surface 525 of component 510 to eliminate capillary action of the silicone gel between surfaces 520 and 525. The bed of pins containing the LCD stack-up is then placed into an oven and heated for a minimum of 16 hours at 65° C. in order to cure the bondlines (i.e., the thickness of layers of gel 320 and 420) and maximize the strength of the gel adhesive.

Figure 7:
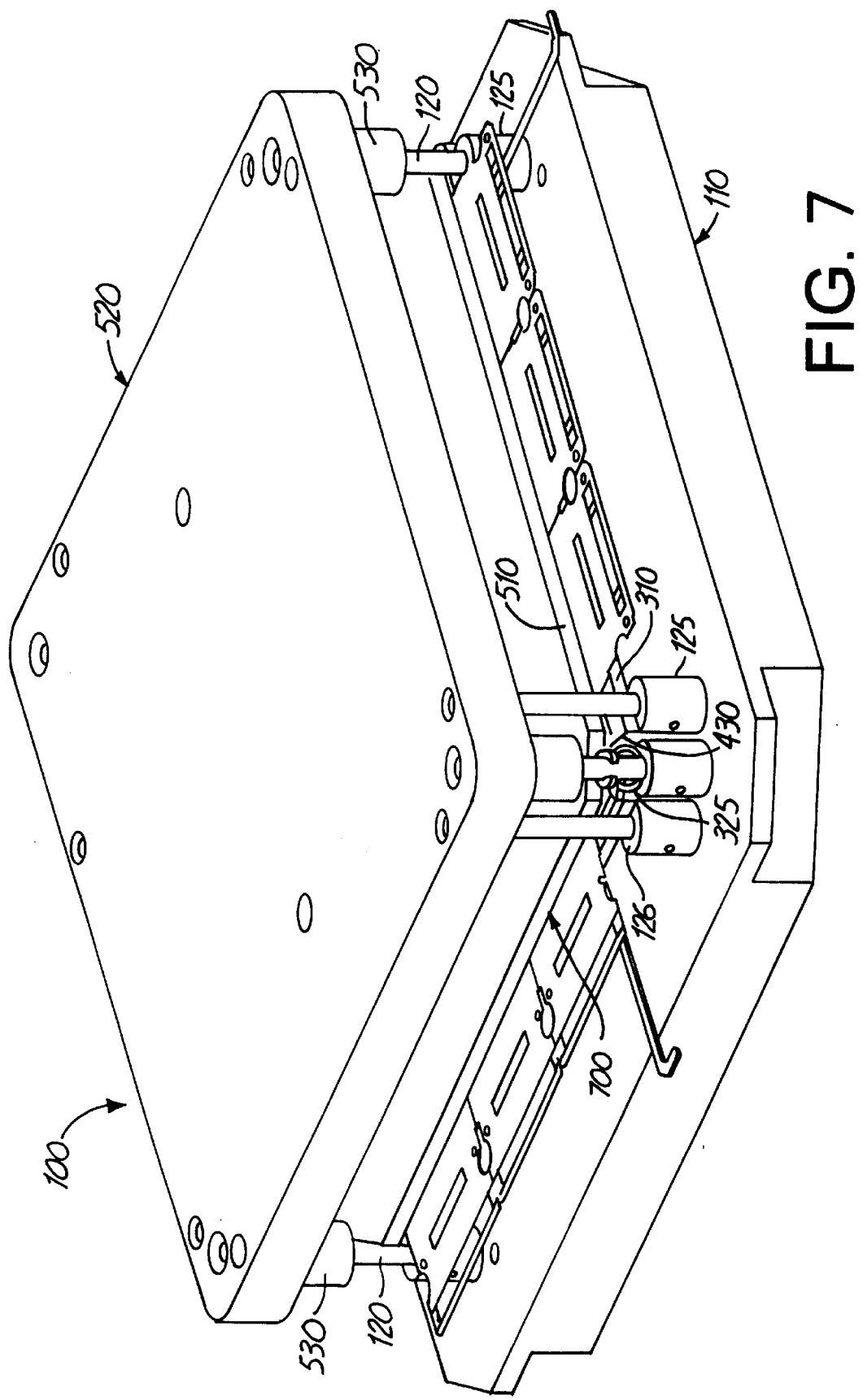
FIG. 7 is a diagrammatic perspective view illustrating the step shown in FIG. 6 of the method of the present invention.

FIG. 7 is a perspective view of the lamination fixture 100 and LCD stack-up or assembly 700. As can be seen in FIG. 7, component or assembly 310 is supported on surfaces 126 of standoffs 125, while pressure is applied to component or assembly 510 by surfaces 535 (not shown in FIG. 7) of standoff 530. With pins 120 maintaining alignment between the optical components and LCD, tight alignment tolerances can be maintained. Further, with capillary action between the components 310 and 510 and respective adjacent platens 110 and 520 being eliminated, and with spacing between the optical components and the LCD being aided with the use of shims 325 and 430, bondline tolerances can be consistently maintained throughout the stack-up.

Figure 8:
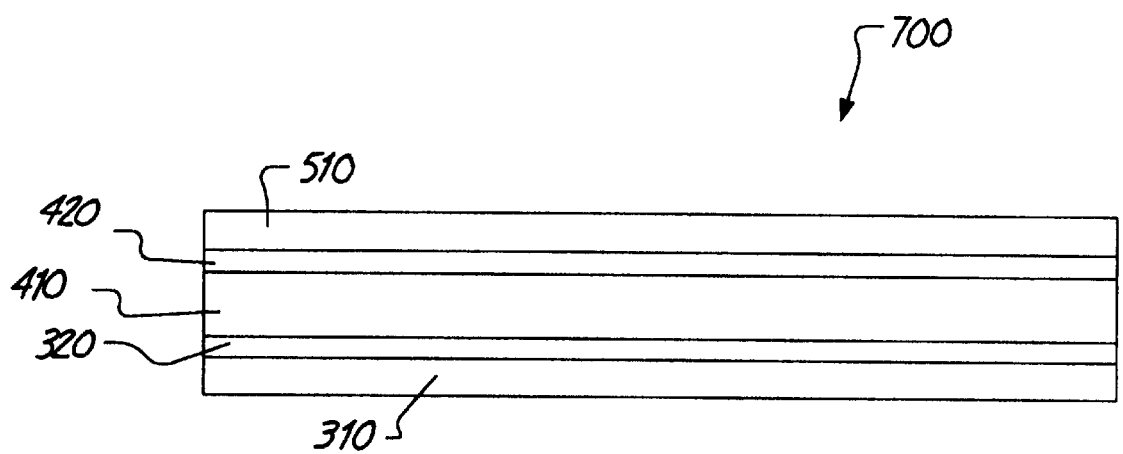
FIG. 8 is a side view of an LCD stack-up created according to embodiments of the present invention.

FIG. 8 illustrates LCD stack-up or LCD assembly 700 which is the product of the above described process. LCD stack-up 700 includes optical components or assemblies 310 and 510 removably attached to glass surfaces of LCD 410 by layers 320 and 420 of silicone gel. The silicone gel works best as an adhesive when it is applied between glass surfaces. Use of the silicone gel provides numerous advantages over previously used adhesives such as epoxy. Silicone gel in general, and particularly the silicone gel described above, has optical characteristics that are more preferable than those of conventionally used adhesive materials. Also, the low durometer (soft) characteristics of the silicone gel used reduces strain on the display. Further, the "soft" characteristics of the silicone gel allows the optical component assemblies to be removed from the LCD so that repairs can be made. This is very advantageous because, when other adhesive materials have been used, LCD repair is difficult or impossible and scrap costs are accordingly increased.

While particular embodiments of the present invention have been shown and described, it should be clear that changes and modifications may be made to such embodiments without departing from the true scope and spirit of the invention. For instance, although a specific silicone gel and mixture ratio has been disclosed as a preferred embodiment, the present invention is not limited to this type or mixture of silicone gel. Further, other adhesive types can be used. Also, it is clear that an LCD stack-up having an optical component attached to only one side can be made using the gel adhesive and methods. In these instances, the LCD can be placed into the alignment fixture first, and the single optical component can be subsequently placed on top of the LCD and a layer of silicone gel. It is intended that the appended claims cover all such changes and modifications.

Although the present invention has been described with reference to illustrative embodiments, workers skilled in the art will recognize that changes may be made in form and detail without departing from the spirit and scope of the invention.

What is claimed is:

1. A method of assembling a liquid crystal display stack-up, the method comprising:

providing a first platen having a plurality of pins extending from a first surface of the first platen, and having a plurality of standoffs extending from the first surface of the first platen;

placing a first optical component into the plurality of pins extending from the first surface of the first platen such that the plurality of pins orients the first optical component in a desired orientation, and such that a first surface of the first optical component is supported by surfaces of the plurality of standoffs to thereby position the first optical component above and spaced apart from the first surface of the first platen;

applying a first quantity of silicone gel to a second surface of the first optical component; and placing a second optical component into the plurality of pins such that the second surface of the first optical component is positioned adjacent to and facing a first surface of the second optical component, and such that the first and second optical components have a desired alignment relative to one another, the first quantity of silicone gel forming a layer of silicone gel sandwiched between the second surface of the first optical component and the first surface of the second optical component.

2. The method of claim 1, and before placing the second optical component into the plurality of pins, further comprising positioning a first set of shims partially on top of the second surface of the first optical component, wherein upon placing the second optical component into the plurality of pins the first set of shims maintains a desired spacing between the first optical component and the second optical component.

3. The method of claim 2, wherein positioning the first set of shims partially on top of the second surface of the first optical component further comprises coupling the first set of shims to pins in the plurality of pins.

4. The method of claim 2, and further comprising:

positioning a second set of shims partially on top of a second surface of the second optical component;

applying a second quantity of silicone gel to the second surface of the second optical component;

placing a third optical component into the plurality of pins such that the second surface of the second optical component is positioned adjacent to and facing a first surface of the third optical component with the second and third optical components maintained a desired spacing apart by the second set of shims, and such that the first, second and third optical components have a desired alignment relative to one another, the second quantity of silicone gel forming a layer of silicone gel sandwiched between the second surface of the second optical component and the first surface of the third optical component.

5. The method of claim 4, and further comprising placing a second platen on top of a second surface of the third optical component to apply pressure to the layers of silicone gel, the second platen having a first surface and a plurality of standoffs extending from the first surface, wherein the surfaces of the plurality of standoffs of the second platen are supported by the second surface of the third optical component to thereby position the second platen above and spaced apart from the second surface of the third optical component.

6. The method of claim 5, wherein placing the second optical component into the plurality of pins comprises placing a liquid crystal display into the plurality of pins.

7. The method of claim 5, and after placing the second platen on top of the second surface of the third optical component, further comprising heating the liquid crystal display stack-up to at least about 65° C. for at least about 16 hours.

8. The method of claim 1, wherein providing the first platen comprises providing the first platen having the plurality of pins arranged such that they make contact with corner regions of the optical components.

9. The method of claim 8, wherein providing the first platen comprises providing the first platen having at least some of the plurality of standoffs surrounding respective ones of the plurality of pins.

10. An apparatus for use in assembling a liquid crystal display stack-up, the apparatus comprising:
- a first platen;
- a first plurality of pins extending from a first surface of the first platen and arranged such that the first plurality of pins is adapted to receive at least two optical components into the first plurality of pins to maintain an alignment between the at least two optical components; and
- a first plurality of standoffs extending from the first surface of the first platen, the first plurality of standoffs providing surfaces adapted to supported a first surface of a first optical component to thereby position the first optical component above and spaced apart from the first surface of the first platen.

11. The apparatus of claim 10, and further comprising:
- a second platen; and
- a second plurality of standoffs extending from a first surface of the second platen, the second plurality of standoffs providing surfaces adapted to rest upon a surface of a second optical component to thereby position the first surface of the second platen above and spaced apart from the surface of the second optical component.

12. An apparatus for use in assembling a liquid crystal display component stack-up, the apparatus comprising:
- first platen means for receiving and maintaining alignment between a plurality of optical components while maintaining a desired spacing between a first surface of the first platen means and the optical components; and
- second platen means for applying pressure to the optical components while maintaining a desired spacing between a first surface of the second platen means and the optical components.

* * * * *